United States Patent
Pochon et al.

(10) Patent No.: US 7,356,599 B2
(45) Date of Patent: Apr. 8, 2008

(54) METHOD AND APPARATUS FOR DATA NORMALIZATION

(75) Inventors: Bastian Pochon, Corcelles (CH); Paolo Scotton, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 10/064,943

(22) Filed: Aug. 30, 2002

(65) Prior Publication Data

US 2003/0048793 A1 Mar. 13, 2003

(30) Foreign Application Priority Data

Aug. 30, 2001 (EP) ................................. 01120890

(51) Int. Cl.
*G06F 15/16* (2006.01)
(52) U.S. Cl. ...................................... 709/229; 709/228
(58) Field of Classification Search ................ 709/229, 709/228; 707/20
See application file for complete search history.

(56) References Cited

U.S. PATENT DOCUMENTS 6,279,113 B1 * 8/2001 Vaidya .......................... 726/23
6,954,765 B2 * 10/2005 Spiegel ....................... 707/200

OTHER PUBLICATIONS

Ptacek et al. "Insertion, Evasion, and Denial of Service: Eluding Network Intrusion Detection", Secure Network, Inc., Jan. 1998.

Jackson, Kathleen A., "Intrusion Detection System (IDS) Product Survey", Version 2.1, Los Alamos National Laboratory, Los Alamos, New Mexico, 1999.

Handley et al. "Network Intrusion Detection: Evasion, Traffic Normalization, and End-to-End Protocol Semantics", International Computer Science Institute, Berkley, Feb. 2001.

Denning, Dorothy E., "An Intrusion-Detection Model", IEEE Transactions on Software Engineering, vol. SE-13, No. 2, Feb. 1987, pp. 222-232.

Comer, Douglas E., Internetworking with RCP/IP, Principles, Protocols, and Architectures, 4th Edition, Prentice Hall 2000, Chapter 7, pp. 95-114.

* cited by examiner

*Primary Examiner*—Jason Cardone
*Assistant Examiner*—Adnan Mirza
(74) *Attorney, Agent, or Firm*—Gibb & Rahman, LLC; Eustus D. Nelson, Esq.

(57) ABSTRACT

A method that allows the normalization of traffic data that is simultaneously transferred to a network intrusion detection system (NIDS) and monitored end-systems located in a network, such as a TCP/IP network, in which packets of data such as IP datagrams, are fragmented and reassembled. Accordingly, the information of received fragments and/or the topology of the network comprising the network intrusion detection system (NIDS) and the monitored end-systems are entered into a normalization table, that is dynamically established and maintained. Subsequently packets of data such as IP datagrams are modified, redirected or discarded in case that ambiguities are detected when comparing information contained in the normalization table with information contained in the headers of the received data packets.

14 Claims, 14 Drawing Sheets

METHOD AND APPARATUS FOR DATA NORMALIZATION

BACKGROUND OF INVENTION

The present invention relates to a method and an apparatus for normalization of traffic data in networks, such as TCP/IP networks.

The present invention specifically relates to a method and a traffic normalizer designed to normalize traffic data which is simultaneously transferred to a network intrusion detection system and an end-system monitored thereby, in order to eliminate ambiguities while reducing transmission delays or overload situations in the installed traffic normalizer or the related network.

According to Kathleen A. Jackson, INTRUSION DETECTION SYSTEM (IDS) PRODUCT SURVEY, Version 2.1, Los Alamos National Laboratory 1999, Publication No. LA-UR-99-3883, Chapter 1.2, IDS OVERVIEW, intrusion detection systems attempt to detect computer misuse. Misuse is the performance of an action that is not desired by the system owner; one that does not conform to the system's acceptable use and/or security policy. Typically, misuse takes advantage of vulnerabilities attributed to system misconfiguration, poorly engineered software, user neglect and to basic design flaws in protocols and operating systems.

Intrusion detection systems analyse on-line activities of internal and/or external users for forbidden (i.e. invalid) and anomalous (i.e., a typical, inconsistent) behaviour. They are based on the hypothesis that monitoring and analysing network transmissions, system audit records, system configuration, data files and further information can detect misuse. Also see, Dorothy E. Denning, IEEE TRANSACTIONS ON SOFTWARE ENGINEERING, VOL. SE-13, NO. 2, February 1987, pages 222-232. This information encompasses vast quantities of data which at least partially are processed in real-time preferably in dedicated network processors.

In a publication by Thomas H. Ptacek and Timothy N. Newsham, entitled Insertion, Evasion, and Denial of Service: Eluding Network Intrusion Detection, Secure Network Inc., January 1998, it is described that known network-based intrusion detection systems are susceptible to direct attacks which are based on an intruders intention of establishing a difference of information provided to an network intrusion detection system and to a monitored end-system that either allows to misuse the network intrusion detection system or the monitored end-system.

Network intrusion detection systems work by predicting the behaviour of networked machines based on packets they exchange. A number of issues exist which make the actual information content of packets captured by an network intrusion detection system ambiguous. A network intrusion detection system is typically implemented in a machine that is entirely different from a system it is monitoring. In addition packets processed in the network intrusion detection system and the end-system are normally taken from different points within a network topology. In many cases it can therefore not be accurately predicted whether packets received by the network intrusion detection system even reach the monitored end-system or are processed in the same manner therein.

An network intrusion detection system can accept a packet that an end-system rejects. An network intrusion detection system that does this makes the mistake of believing that the end-system has accepted and processed the packet when it actually has not. An attacker can exploit this condition by sending packets to an end system that it will reject, but that the network intrusion detection system will think are valid. In doing this, the attacker is "inserting" data into the network intrusion detection system. On the other hand an end-system can accept a packet that an network intrusion detection system rejects. An network intrusion detection system that mistakenly rejects such a packet misses its contents entirely. This condition can also be exploited, this time by slipping crucial information past the network intrusion detection system in packets that the network intrusion detection system is to strict about processing. These packets are therefore "evading" the scrutiny of the network intrusion detection system as described by Ptacek et al.

In order to avoid ambiguities in the traffic streams reaching the network intrusion detection system and a monitored end-system it has been proposed to use a traffic normalizer that processes a data traffic forwarded to a site in such a way that potential ambiguities are eliminated.

In TCP/IP networks ambiguities are often related to fragmentation of datagrams which in sizes limited by the given maximum transfer units (MTU) are transferred across networks and sub-networks.

As described by Douglas E. Comer in INTERNETWORKING with TCP/IP, PRINCIPLES, PROTOCOLS, AND ARCHITECTURES, 4th EDITION, Prentice Hall 2000, chapter 7, pages 95-114, in the ideal case an entire datagram of the IP layer fits into one frame that normally travels across many types of physical networks as it moves across an internet to its final destination (regarding layering in TCP/IP environments see pages 187-191).

A datagram of IP version 4 is limited to a maximum size of 65,535 octets. The physical network treats the entire datagram, including its header as data encapsulated in the data area of the frame. Each packet switching technology places a fixed upper bound on the amount of data that can be transferred in one physical frame. For example, Ethernet limits data content to 1500 octets, while FDDI allows 4352 octets of data per frame. The limits are referred to as maximum transfer units (MTU). Allowing datagrams to be larger than the minimum MTU, called the path MTU (see Comer, page 702), in an internet therefore means that a datagram not always fits into a single network frame. Instead of designing datagrams that adhere to the constraints of physical networks, TCP/IP software chooses a convenient initial size and divides large datagrams into fragments that can be encapsulated in frames of a network that has a smaller MTU (see Comer, pages 102-104).

As shown in FIG. 1, hosts A and B are attached to different Ethernets which have a maximum transfer unit MTU of 1500 octets. Thus, both hosts can generate and send datagrams up to 1500 octets long. However, the path between said Ethernets includes a network with a maximum transfer unit MTU of 620 octets. If host A sends host B a datagram, larger than 620 octets, router 1 will split the datagram into fragments that can be encapsulated in a frame of the underlying network.

As shown in FIG. 2, a datagram with a datagram header and 1400 octets of data will for example be split into two fragments containing 600 octets of data each and one fragment containing 200 octets of data. The headers of the fragments 1 and 2 have the MORE FRAGMENTS bit set in the fragment headers, indicating that further fragments will follow (see Comer, page 98, FIG. 7.3, datagram format).

The fields in the datagram header, IDENTIFICATION, FLAGS, and FRAGMENT OFFSET, control fragmentation and reassembly of datagrams.

The FRAGMENT OFFSET field in the fragment header specifies in units of 8 octets the offset in the original datagram for the data being carried in a fragment.

Most of the content of the fragment header is duplicated from the originating datagram with an exception of the fields FLAGS and FRAGMENT OFFSET.

Once a fragment has been fragmented the fragments travel as separate datagrams all the way to the ultimate destination where they are reassembled. Field IDENTIFICATION, which is copied to each fragment, allows the destination to know which arriving fragments belong to which datagrams. The receiving machine (FIG. 1, host B) starts a reassembly timer when it receives an initial fragment. If the timer expires before all fragments arrive, the receiving machine discards the received pieces without processing the datagram (see Comer, pages 104-105).

However, in case that host A (see FIG. 1) does not want a datagram to be fragmented it can set the do not fragment bit DF in the field FLAGS to 1. Whenever a router (e.g. router 1) needs to fragment a datagram that has the do not fragment bit DF set, the router discards the datagram and sends an error message back to the source.

Because end-systems (FIG. 1, host A or host B) will reassemble the received fragments, it is important that the network intrusion detection system correctly reassembles the fragments as well. A network intrusion detection system that does not correctly reassemble fragments can be attacked simply by using artificially fragmented packets (see Ptacek, pages 20-23).

FIG. 3 shows such a situation, where an attacker (host B) hides an attack behind two fragments. The attacked host (host A) reassembles the datagram correctly so that data intended for misuse is generated while the network intrusion detection system NIDS does not recognize the attacking situation due to different reassembly of the fragments.

A network intrusion detection system that correctly reassembles fragments may still be subject to attacks. In case that reassembly algorithms of the network intrusion detection system and the monitored end-systems are inconsistent, then an attacker, knowing these weaknesses, could exploit differences in the reassembly procedures in order to attack end-systems while by-passing the network intrusion detection system undetected.

A further problem involves fragmentation overlap, which occurs when fragments of differing sizes arrive in overlapping positions. If a fragment arriving at an end-system contains data that has already arrived in a different fragment, it is possible that the newly arrived data will overwrite some of the old data.

Information required to reassemble fragments of a datagram could therefore be manipulated by an attacker in order to generate overlaps that are handled differently by the network intrusion detection system and the monitored end-systems.

Differences in the systems may arise depending on the order of arrival of the fragments or depending on the position of the overlap. A network intrusion detection system that does not follow the same interpretation of the received fragments is therefore vulnerable to evasion attacks.

FIG. 4 shows a further example of an attack exploiting fragmentation ambiguity. The attacker sends a first fragment covering octets 0 . . . 3 of the data area of the originating datagram and then a second fragment covering octets 3 . . . 5. In the given example reassembly of octets 0 . . . 3 of the first fragment and octets 4 and 5 of the second fragment results in a data string designed for misuse purposes.

If the reassembly algorithm of the attacked end-system favors old and the reassembly algorithm of the network intrusion detection system NIDS favors new data, then the network intrusion detection system NIDS will miss the attack as shown in FIG. 4.

As described above, each "link" within an internet is characterised by a maximum transfer unit MTU which limits the maximum amount of data that can be sent in a physical frame on a given link. A datagram gets fragmented if its size is larger than the maximum transfer unit MTU. In case that the do not fragment bit DF is set and the maximum transfer unit MTU does not allow the encapsulation of the whole datagram in one physical frame, then the router discards the datagram and sends an error message back to the source.

An attacker having knowledge of the network's topology can use the do not fragment DF bit in order to insert datagrams to the network intrusion detection system NIDS while the same datagrams are discarded on their way to the end-system.

In the example shown in FIG. 5, host A sends datagrams that are addressed to host B across a network which comprises three sub-networks having different maximum transfer units MTU.

The attacker may know, that, starting from host A, a datagram is routed through a first and a second network comprising a maximum transfer unit MTU of 1500 octets. From the second network, to which a network intrusion detection system NIDS is attached, the datagram is routed through a third network with a maximum transfer unit MTU of 620 octets before it reaches host B.

Setting the do not fragment bit DF to 1 while selecting a datagram size smaller than 1500 octets and larger than 620 octets would therefore result in a transfer of datagrams to the second network and further to the network intrusion detection system NIDS as well as to the router 3 which however discards the datagrams since fragmentation would be required in order to transfer the datagrams across the third network to host B.

The network intrusion detection system NIDS would therefore be vulnerable to attacks.

Further ambiguities may result from a given network topology in view of the content of the TIME TO LIVE field which is sequentially altered during the journey of a datagram or a fragment across an internet.

As described in Comer, page 106 the TIME TO LIVE specifies how long, in seconds, a datagram is allowed to remain in the internet system. Routers and hosts that process datagrams must decrement the content of the TIME TO LIVE field as time passes and remove the datagram from the internet when its time expires. During normal operation each router along the path from source to destination is required to decrement the TIME TO LIVE field by 1 when it processes the destination header. Thus, in practice, the TIME TO LIVE field acts as a "hop limit".

An attacker having knowledge of the network's topology can therefore manipulate the TIME TO LIVE field in order to set the "hop limit" to a point located between the network intrusion detection system NIDS and the receiving end-system, i.e. host B.

Knowing the network's topology an attacker can therefore, as with the DF bit, insert datagrams to the network intrusion detection system NIDS while the same datagrams are discarded on their way to the end-system by manipulation of the TIME TO LIVE field.

In the network shown in FIG. 5 it takes two hops (-->router 1 and then-->router 2) from host A to the network intrusion detection system N host B. Setting the TIME TO LIVE field higher than 2 and lower or equal to 4 will allow an attacker, starting from host A, to send and insert datagrams to the network intrusion detection system NIDS which then are discarded on their way to host B resulting in an ambiguity that can be exploited by the attacker.

In [5], M. Handley, V. Paxson, Ch. Kreibich, Network Intrusion Detection: Evasion, Traffic Normalization, and End-End Protocol Semantics, International Computer Science Institute, Berkley, February 2001, the viability of addressing the described problem by introducing a traffic normalizer is discussed, that eliminates potential ambiguities before the traffic is seen by the network intrusion detection system NIDS and a monitored end-system. As a result the network intrusion detection system NIDS, that is monitoring correctly normalized traffic, no longer needs to consider potential ambiguities while interpreting the data stream. FIG. 6 and [5], FIG. 2 show the typical location of the traffic normalizer relative to the network intrusion detection system NIDS and end-systems being monitored.

In order to avoid ambiguities resulting from overlapping fragments, in [5] it is recommended to reassemble incoming fragments in the normalizer rather than forwarding them to the monitored end-system. In case that they are larger than the maximum transfer unit MTU, the datagrams are re-fragmented before they are sent to the monitored end-system.

As explained in [5] a traffic normalizer that reassembles datagrams is vulnerable to stateholding attacks. While the traffic normalizer can remove fragment-based ambiguities by reassembling all fragmented IP datagrams (and if necessary re-fragment the reassembled datagram) the traffic normalizer must hold the fragments in memory before they can be reassembled. An attacker can thus cause the traffic normalizer to use up memory space by sending many fragments of datagrams without ever sending enough to complete a datagram.

Besides the need of memory resources this method burdens a high workload onto the traffic normalizer and causes corresponding delays in delivery of the data to the end-system which may create further problems.

In order to avoid ambiguities resulting from a do not fragment flag DF being set, as described above, in [5] it is recommended to clear the do not fragment flag DF on incoming datagrams.

As described in [5] this measure systematically breaks path MTU discovery which is undesirable. To discover the path MTU, a sender probes the path by sending datagrams with the IP do not fragment flag DF set. It then decreases the size of the datagrams if ICMP error messages report that fragmentation was required. Knowing the path maximum transfer unit MTU allows to select an optimum size of TCP segments so that IP datagrams carrying the segments are as large as possible without requiring fragmentation along the path from the source to the destination (see [4], page 223).

In order to avoid ambiguities resulting from settings of the TIME TO LIVE field, as described above, in [5] it is recommended set the TIME TO LIVE field larger than the longest path across the internal site, i.e. the intranet shown in FIG. 6.

Drawbacks of this measure described in [5] are the brake of traceroute, a program that prints the path to a destination (see [4], page 715), or the occurrence of perpetual loops of datagrams passing through the traffic normalizer thereby consuming the available bandwidth.

It would therefore be desirable to create an improved method and a traffic normalizer designed for normalizing traffic data which is transferred to a network intrusion detection system and to an end-system monitored thereby.

It would be desirable in particular to provide a normalization method that allows to eliminate ambiguities in a data stream while preventing transmission delays or overload situations in the installed traffic normalizer or the related network.

It would further be desirable to create a normalization method which reduces vulnerabilities of network elements while not restricting the use of procedures such as traceroute or path MTU discovery which were created to optimise operating conditions.

SUMMARY OF INVENTION

The above and other objects of the present invention are achieved by a method and an apparatus for normalization of traffic data in networks, such as TCP/IP networks, comprising an network intrusion detection system according to claim 1 and claim 14.

The inventive method allows the normalization of traffic data that is simultaneously transferred to a network intrusion detection system and to a monitored end-system located in a network, such as a TCP/IP network, in which packets of data such as IP datagrams, are fragmented and reassembled.

According to the present invention information of received fragments and/or the topology of the network comprising the network intrusion detection system and the monitored end-system are entered into a normalization table, that is dynamically established and maintained. Subsequently packets of data such as IP datagrams are modified, redirected or discarded in case that ambiguities are detected when comparing information contained in the normalization table with information contained in the headers of the received data packets.

Fragments received are registered in the normalization table and forwarded to the end-system immediately thereafter, in case that no conflict is detected with data of previously received fragments, or discarded or redirected in case that a conflict is detected.

Preferably for every incoming fragment, based on the content of the header fields IDENTIFICATION, PROTOCOL, SOURCE IP ADDRESS and DESTINATION IP ADDRESS, an identifier is built that allows a)to assign the fragment to data stored in the normalization table which belongs to earlier received fragments of an identified datagram $d_i$ and to update the normalization table with header data of the received fragment or b)in case that no fragments of the identified datagram were received earlier, to establish a new entry for the identified datagram and update the normalization table with header data of the received fragment.

Fragments are therefore immediately forwarded, thus avoiding transmission delays, while ambiguities are eliminated. Furthermore payload or data of data packets or fragments is not or only transiently stored while performing normalization. Susceptibility to congestion or vulnerability to denial of service attacks of the traffic normalizer is therefore significantly reduced.

For each datagram the header field FRAGMENT OFFSET is extracted and the length of the fragment data is calculated by means of the fields HEADER LENGTH and TOTAL LENGTH in order to establish the structure or information about the received section of the identified datagram without storing data of the identified datagram in said structure or normalization table.

In a preferred embodiment a partial and the complete receipt of an identified datagram is recorded by means of a sliding bit-mask which is moved to an offset qi depending on the receipt of fragments, belonging to the identified datagram di, until the offset qi indicates receipt of all data contained in the datagram data area of datagram di, thus further reducing memory space required for normalization purposes.

In a further embodiment of the present invention the distance and/or the path MTU to the end-systems in the network, that are monitored by the network intrusion detection system, are measured and stored in the normalization table before or upon the receipt of a data packet addressed to one of the monitored end-systems.

For a data packet, such as a datagram or fragment received, a calculated TIME TO LIVE value and/or the path MTU are retrieved from the normalization table and a)in case that the content in the TIME TO LIVE field of the datagram or fragment is lower than the required value, then it is replaced by the retrieved value and/orb)in case that the path MTU is lower than the size of the data packet the do not fragment FLAG, in case that it is set, is cleared, while the checksum is recalculated preferably for all modified data packets which are forwarded to the addressed end-system.

Entries in the normalization table are cleared or updated after predefined time periods T1, T2, T3 in order to ensure correct normalization and efficient management of system resources.

An apparatus for normalization of traffic data operating according to the inventive method preferably comprises a control point connected to a network processor which receives the traffic to be normalized and which in a local memory unit comprises the normalization table, based on which the normalization is performed.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

Some of the objects and advantages of the present invention have been stated, others will appear when the following description is considered together with the accompanying drawings, in which.

DETAILED DESCRIPTION

Figure 1:
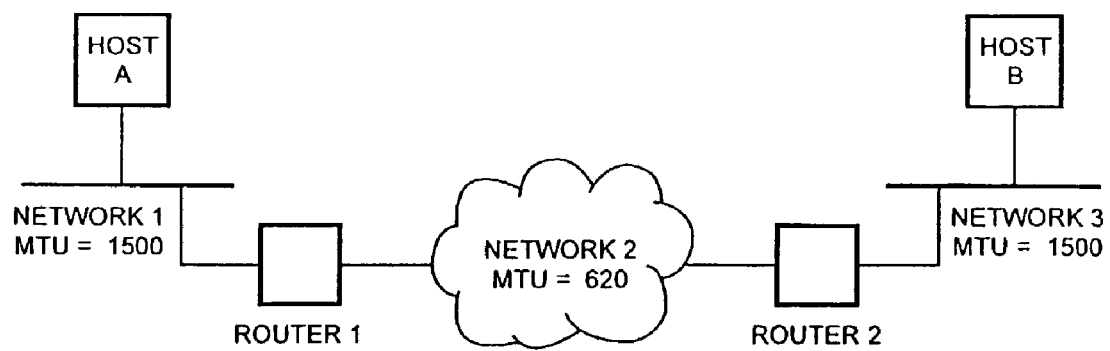
FIG. 1 shows two hosts A and B attached to different Ethernets with a maximum transfer unit MTU of 1500 which are connected by a network with a maximum transfer unit MTU of 620.
Figure 2:
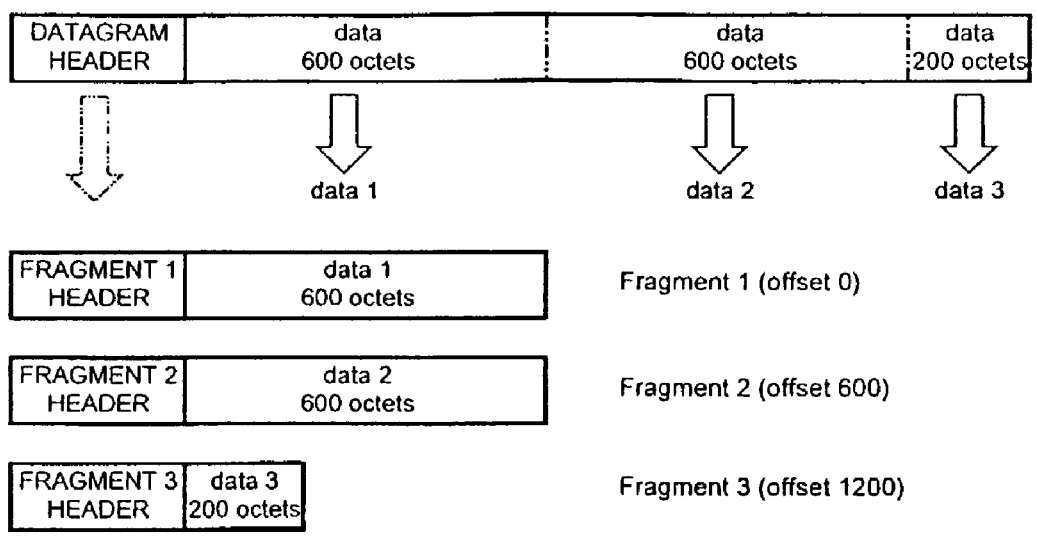
FIG. 2 shows a datagram before and after fragmentation.

FIG. 1 shows two hosts, A and B, attached to a network 1 and a network 3, each with a maximum transfer unit MTU of 1500 octets. Both hosts can therefore generate and send datagrams up to 1500 octets long, while, the path between said Ethernets includes a network 3 with a maximum transfer unit MTU of 620 octets. If hosts A sends host B a datagram larger than 620 octets, router 1 will split the datagram into fragments that can be encapsulated in frames of the underlying network. Fragmentation of a datagram as shown in FIG. 2 has been described above.

As further described above fragmentation of datagrams can result in ambiguities which can be exploited by an attacker in order to by-pass the network intrusion detection system NIDS or misuse end-systems or the network intrusion detection system NIDS itself.

Different attacks which are based on knowledge of the network's topology or differences of handling fragmentation or reassembly procedures in the end-systems and in the network intrusion detection system NIDS were described above with reference to FIGS. 3, 4 and 5.

Figure 3:
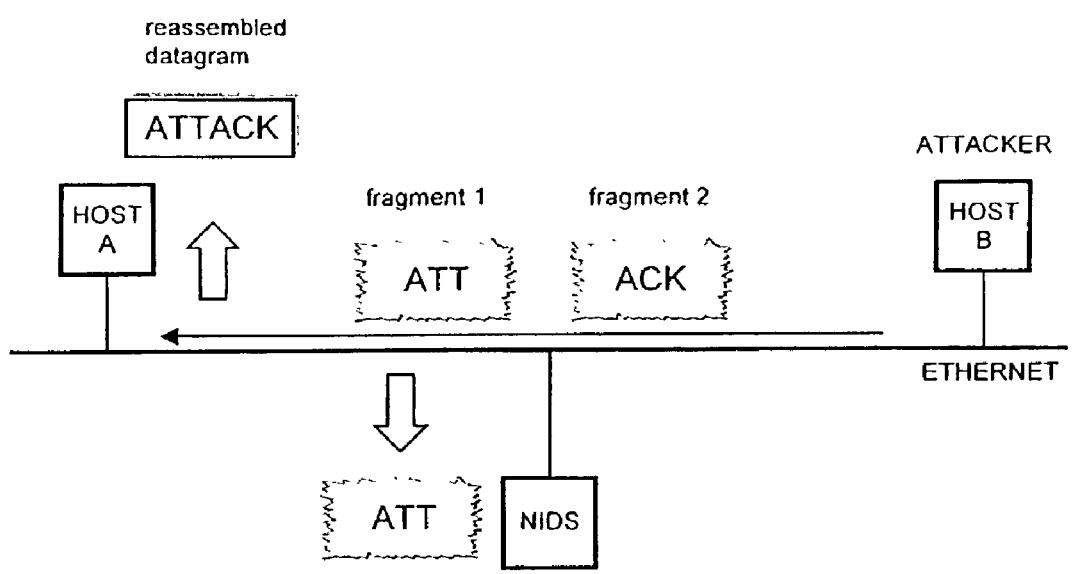
FIG. 3 shows a network intrusion detection system monitoring host A during an attack through host B.

FIG. 3 shows such a situation, where an attacker (host B) hides an attack behind two fragments. The attacked host (host A) reassembles the datagram correctly so that data intended for misuse is generated while the network intrusion detection system NIDS does not recognize the attacking situation due to different reassembly of the fragments.

Figure 4:
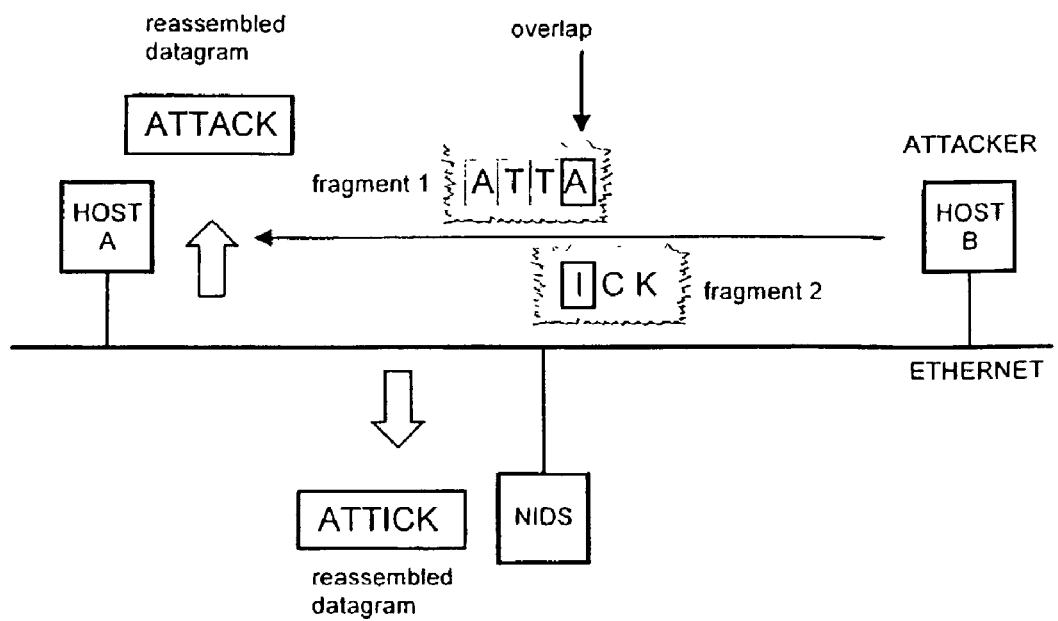
FIG. 4 shows a network intrusion detection system monitoring host A during a further attack through host B.

FIG. 4 shows a further example of an attack exploiting fragmentation ambiguity. The attacker sends a first fragment covering octets 0 . . . 3 of the data area of the originating datagram and then a second fragment covering octets 3 . . . 5. In the given example, reassembly of octets 0 . . . 3 of the first fragment and octets 4 and 5 of the second fragment results in a data string designed for misuse purposes.

If the reassembly algorithm of the attacked end-system favours old and the reassembly algorithm of the network intrusion detection system NIDS favours new data, then the network intrusion detection system NIDS will miss the attack as shown in FIG. 4.

Figure 5:
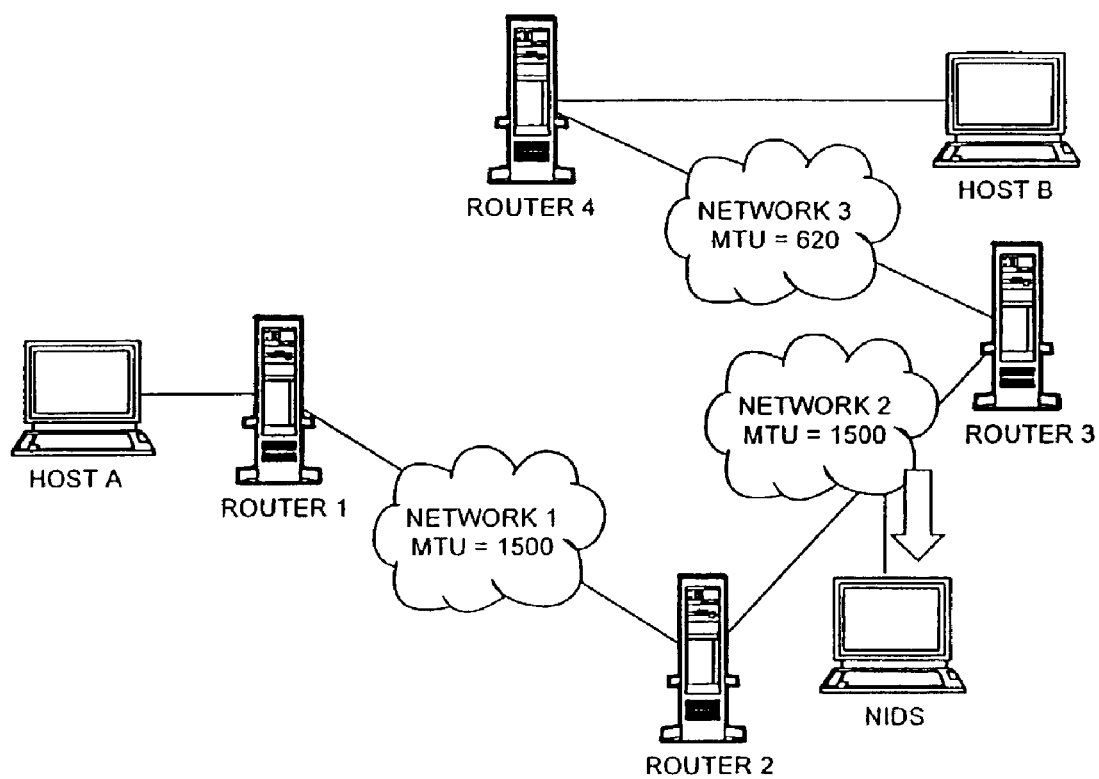
FIG. 5 shows a communication path between hosts A and B which is monitored by a network intrusion detection system.

In the example shown in FIG. 5, host A sends datagrams that are addressed to host B across a network which comprises three sub-networks 1, 2 and 3 having different maximum transfer units MTU. In the given example, the attacker knows that, starting from host A, a datagram is routed through the first and the second network comprising a maximum transfer unit MTU of 1500 octets. From the second network 2, to which the network intrusion detection system NIDS is attached, the datagram, before it reaches host B, is routed through the third network 3 having a maximum transfer unit MTU of 620 octets.

Setting the do not fragment bit DF to 1 while selecting a datagram size smaller than 1500 octets and larger than 620 octets would therefore result in a transfer of datagrams to network 2 and further to the network intrusion detection system NIDS as well as to router 3 which discards the received datagrams since fragmentation would be required in order to transfer the datagrams across network 3 to host B. The network intrusion detection system NIDS would therefore be vulnerable to attacks.

Further ambiguities may result from a given network topology in view of the content of the TIME TO LIVE field which is sequentially altered during the journey of a datagram or a fragment across an internet.

An attacker having knowledge of the network's topology can set the content of the TIME TO LIVE field to a value which allows the fragment to reach the network intrusion detection system NIDS, but not the addressed end-system, i.e. host B.

Figure 6:
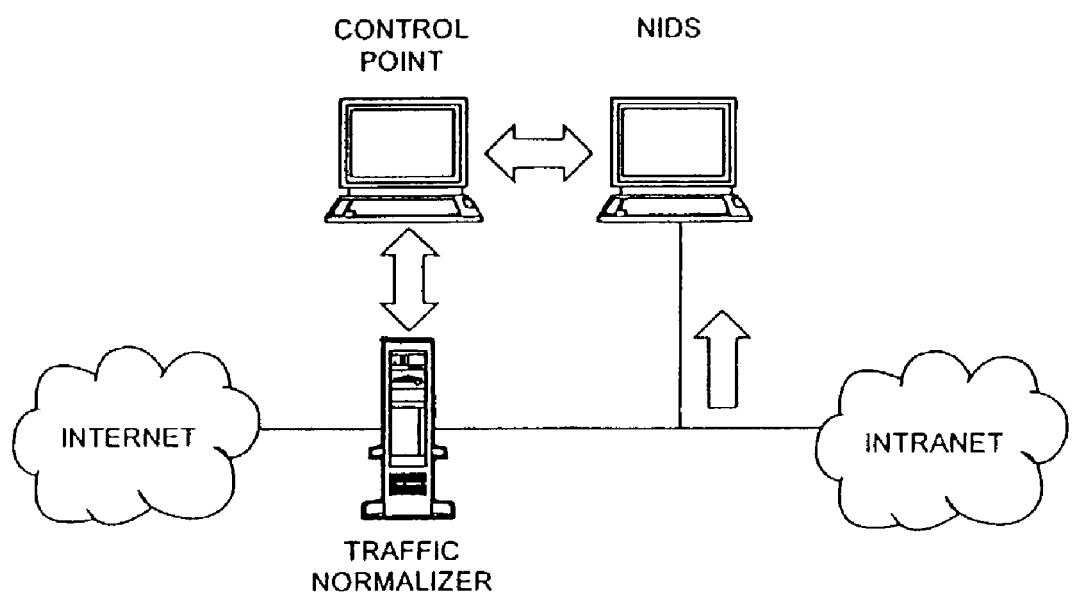
FIG. 6 shows a traffic normalizer with a control system operating together with a network intrusion detection system as shown in FIG. 5.

In order to eliminate the described ambiguities a traffic normalizer, as shown in FIG. 6, is installed in the network system, so that potential ambiguities are eliminated in the data traffic forwarded to the network intrusion detection system NIDS and the monitored end-system. As a result the network intrusion detection system NIDS, that is monitoring correctly normalized traffic, no longer needs to consider potential ambiguities while interpreting the data stream.

In order to improve known normalization processes, which were described above, the data traffic passing through the traffic normalizer is handled as follows.

Figure 12:
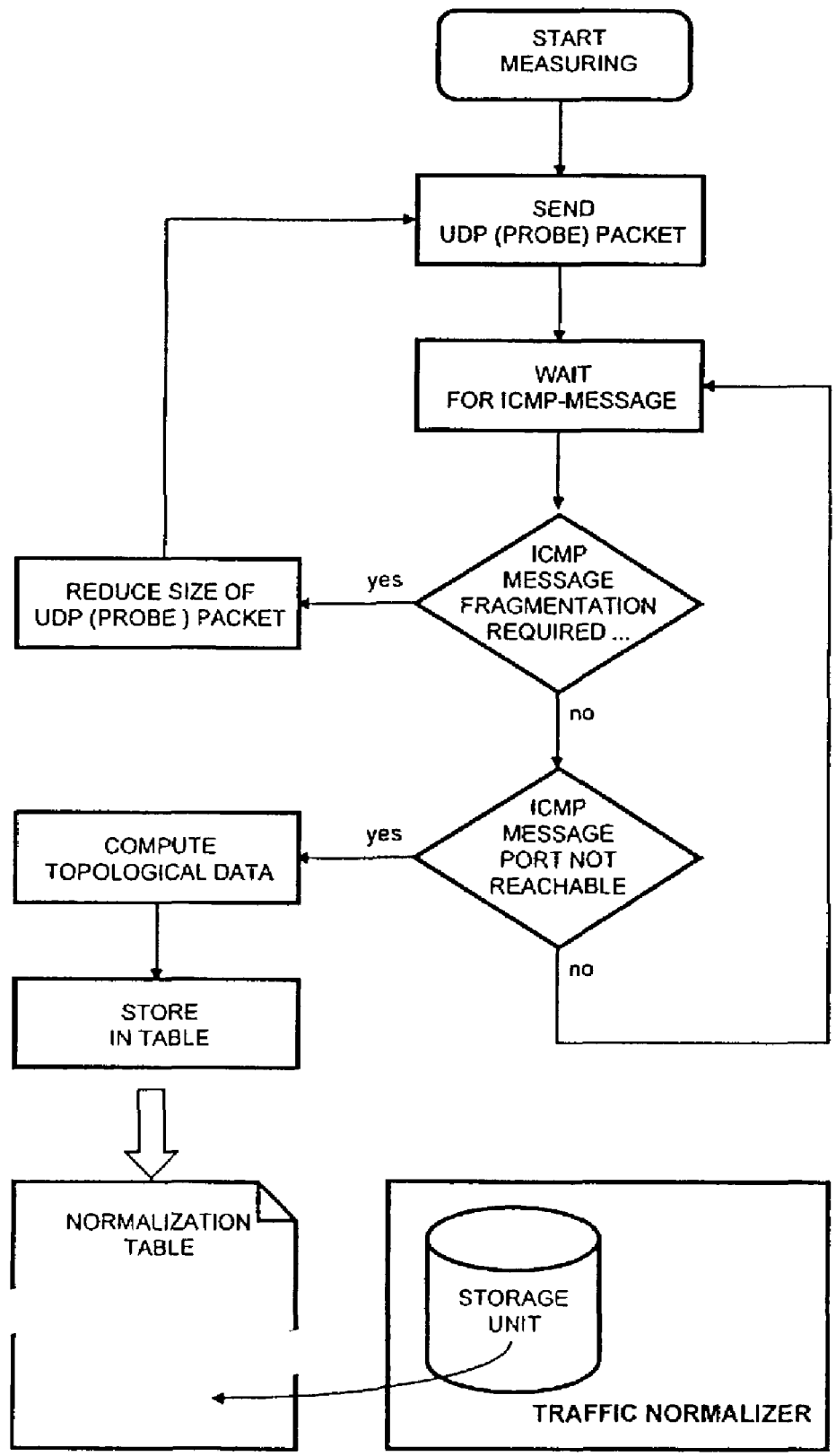
FIG. 12 shows the flow diagram of a process used for collecting required data for the normalization process as indicated in FIG. 10.

According to the present invention information related to received fragments and/or the topology of the network comprising the network intrusion detection system NIDS and the monitored end-systems are entered into a normalization table stored in a database of a network normalizer (see FIG. 12). The normalization table is dynamically established and maintained. Subsequently packets of data such as IP datagrams are modified, redirected or discarded in case that ambiguities are detected when comparing information contained in the normalization table with information contained in the headers of the received data packets.

Figure 7:
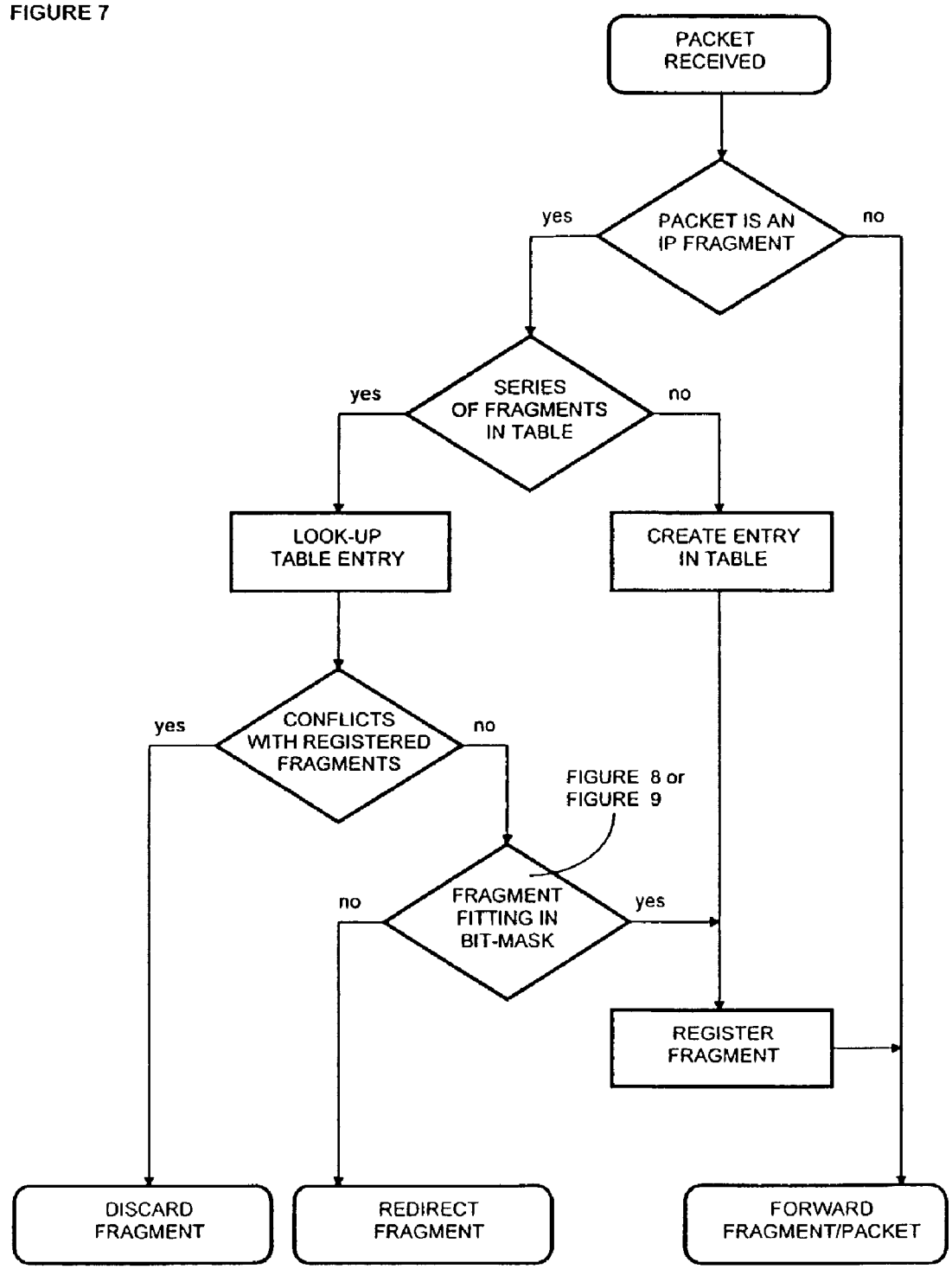
FIG. 7 shows the flow diagram of an inventive normalization process.
Figure 8:
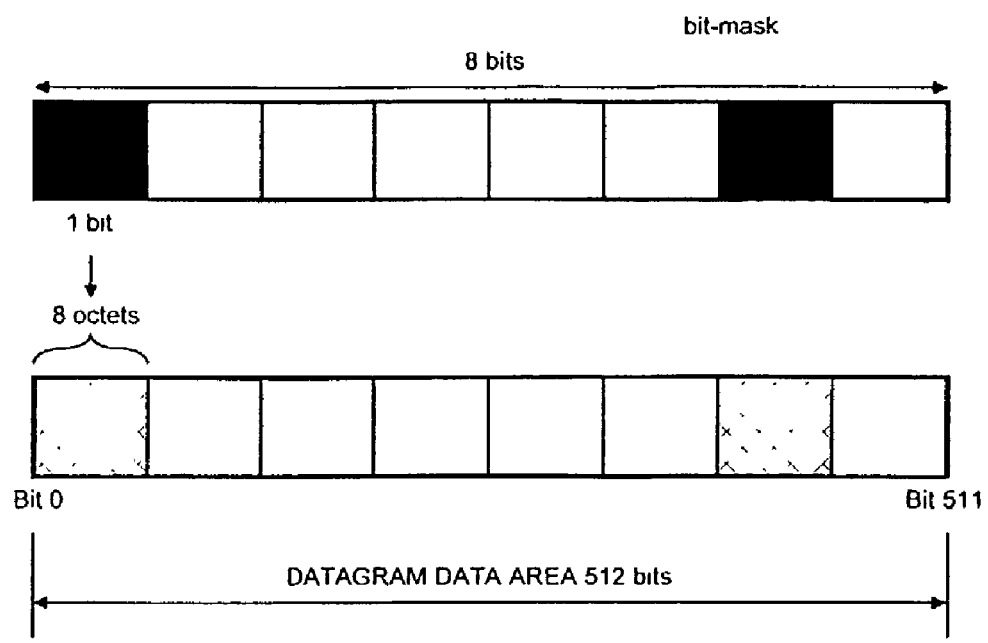
FIG. 8 shows a bit-mask structure used for registering received fragments of a datagram.
Figure 9:
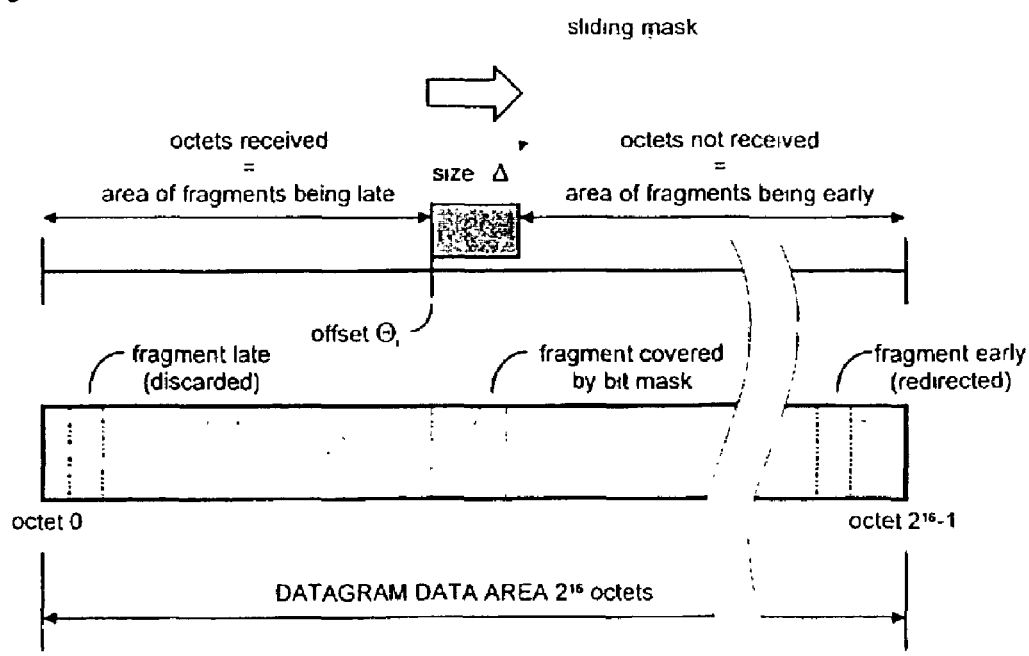
FIG. 9 shows a sliding bit-mask structure used for registering received fragments of a datagram.

A flow diagram of the inventive process of normalizing a data stream is shown in FIG. 7. Upon receipt of a data packet it is checked whether the data packet is a fragment of an IP datagram. Data packets other than IP fragments are forwarded or processed with a different module. In case that an IP fragment has been received it is checked whether fragments of the concerned datagram have been received before. In case that no corresponding fragments were previously received, then an entry in the normalization table is created in which the received fragments are registered, preferably in a bit-mask as shown in FIG. 8 or FIG. 9.

Based on the content of the header fields IDENTIFICATION, PROTOCOL, SOURCE IP ADDRESS and DESTINATION IP ADDRESS, of the incoming fragments an identifier is built that allows a) to assign the fragment to data stored in the normalization table which belongs to earlier received fragments of an identified datagram d and to update the normalization table with header data of the received fragment or, b) in case that no fragments of the identified datagram were received earlier, to establish a new entry for the identified datagram and update the normalization table with header data of the received fragment.

For each datagram the header field FRAGMENT OFFSET is extracted and the length of the fragment data is calculated by means of the fields HEADER LENGTH and TOTAL LENGTH in order to establish the structure or information about the received data section of the identified datagram without storing data of the identified datagram in said structure or normalization table.

In case that an entry already exists for this fragment series then it is checked whether a conflict exists with previously registered fragments which would result in discarding the received fragment. In case that no conflicts are detected it is checked whether the fragment or the frame of its data area fits correctly into said bit-mask of FIG. 8 or FIG. 9. In this step it is primarily made sure that the data of the received fragment can properly be registered in the bit-mask. A conflict situation such as overlapping edges of two fragments would preferably be detected in the former stage. In case that the fragment is not fitting it is preferably redirected to a further normalisation process with enhanced analysis capabilities, else it is registered in the bit-mask.

In the bit-mask of FIG. 8, in which a bit is set for each group of eight octets of data received by means of a fragment, a fragment can be registered independently of its time of arrival. However in this case the whole length of the bit-mask will be stored in memory until the last fragment is received.

Memory space required with the bit-mask of FIG. 8 to register the receipt of datagram data is reduced by a factor of 64. E.g., to register the receipt of 512 bits of datagram data a bit-mask with the length of 8 bits is required. As mentioned above the fragments themselves were already forwarded thus avoiding transmission delays and congestion of the traffic normalizer.

In order to further reduce the memory space required for registering received fragment data or datagram data the traffic normalizer preferably uses a bit-mask with reduced length $\Delta$, as shown in FIG. 9, that is sliding along while fragments are received.

A partial and the complete receipt of an identified datagram is recorded by means of the sliding bit-mask, which is moved to an offset $\Theta_i$ depending on the receipt of fragments, belonging to the identified datagram $d_i$, until the offset $\Theta_i$ indicates receipt of all data contained in the datagram data area of datagram $d_i$.

When using a sliding bit-mask as shown in FIG. 9, then fragments arriving early or late and therefore falling out of the range, covered by the sliding bit-mask with its length $\Delta$, are treated as described below.

An incoming fragment f with the offset $f_\Theta$ and the length fv is a) discarded, depending on the offset $\Theta_i$ of the sliding bit-mask, in case that $\Theta e_i > f_\Theta$ for the sliding bit-mask going in order or $\Theta_i + \Delta < f_\Theta + fv$ for the sliding bit-mask going in reverse order b) redirected, depending on the offset $\Theta_i$ of the sliding bit-mask, to a processing unit with a sliding bit-mask of increased length $\Delta_2, \Delta_3, \ldots$ in case that $\Theta_i + \Delta < f_\Theta + fv$ for the sliding bit-mask going in order or $\Theta_i > f_\Theta$ for the sliding bit-mask going in reverse order.

In order to avoid storage of obsolete data, the registered data belonging to an identified datagram $d_i$ are cleared after the receipt of a corresponding ICMP-message TIMEOUT EXCEEDED WHILE REASSEMBLY or after a time period T1 which is selected equal or slightly higher than the lifetime of the last fragment received and accepted. By this measure attacks are countered, by which numerous fragments of datagrams are sent without ever completing delivery.

As described above, an attacker, knowing the network's topology can, can insert datagrams to the network intrusion detection system NIDS while the same datagrams are discarded on their way to the end-system by manipulation of the TIME TO LIVE field or the DF flag.

In a further embodiment of the invention the distance and/or the path MTU to the end-systems in the network, that are monitored by the network intrusion detection system NIDS, are therefore measured and stored in the normalization table before or upon the receipt of a data packet addressed to one of the monitored end-systems.

Figure 10:
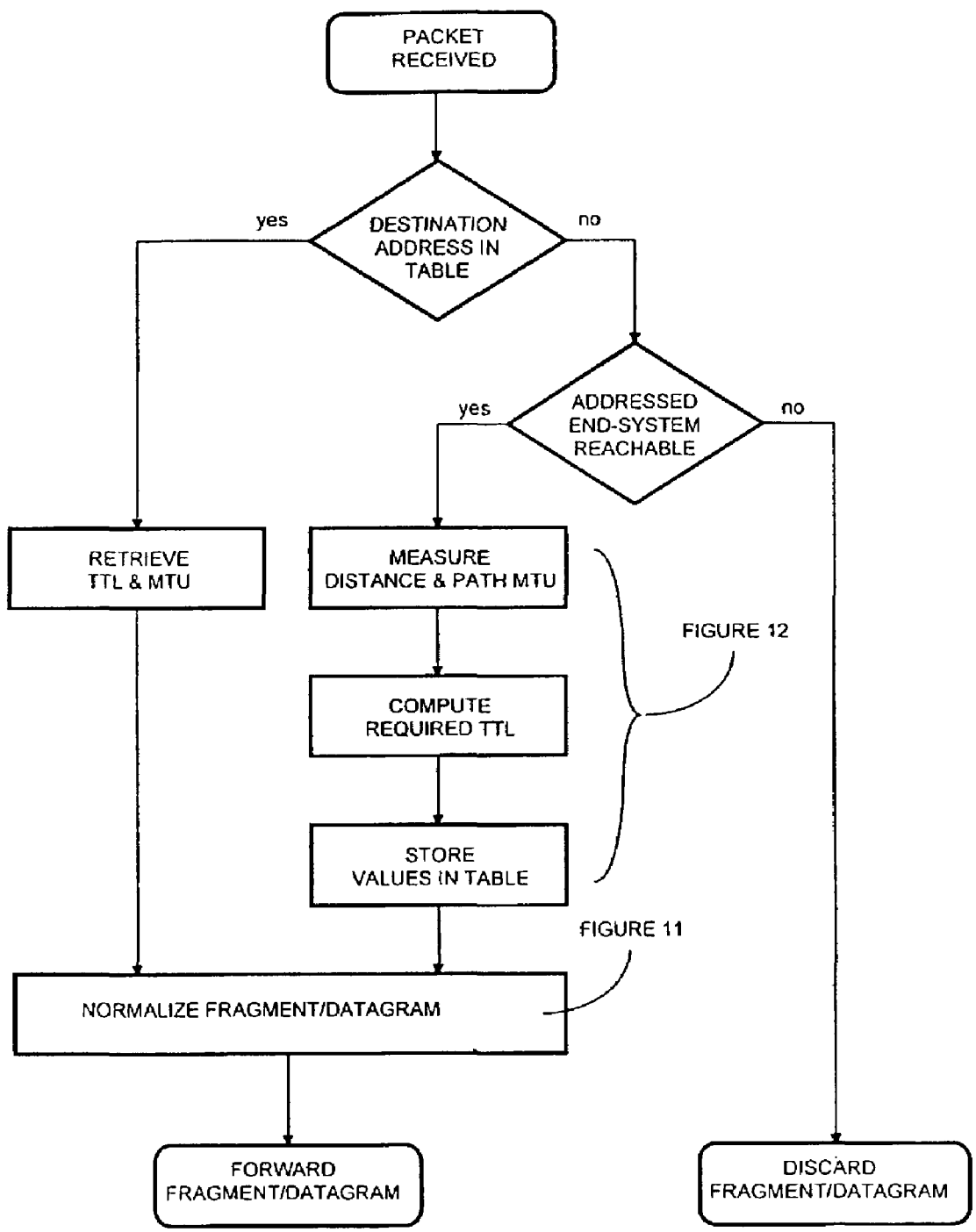
FIG. 10 shows the flow diagram of a further part of the inventive normalization process.
Figure 11:
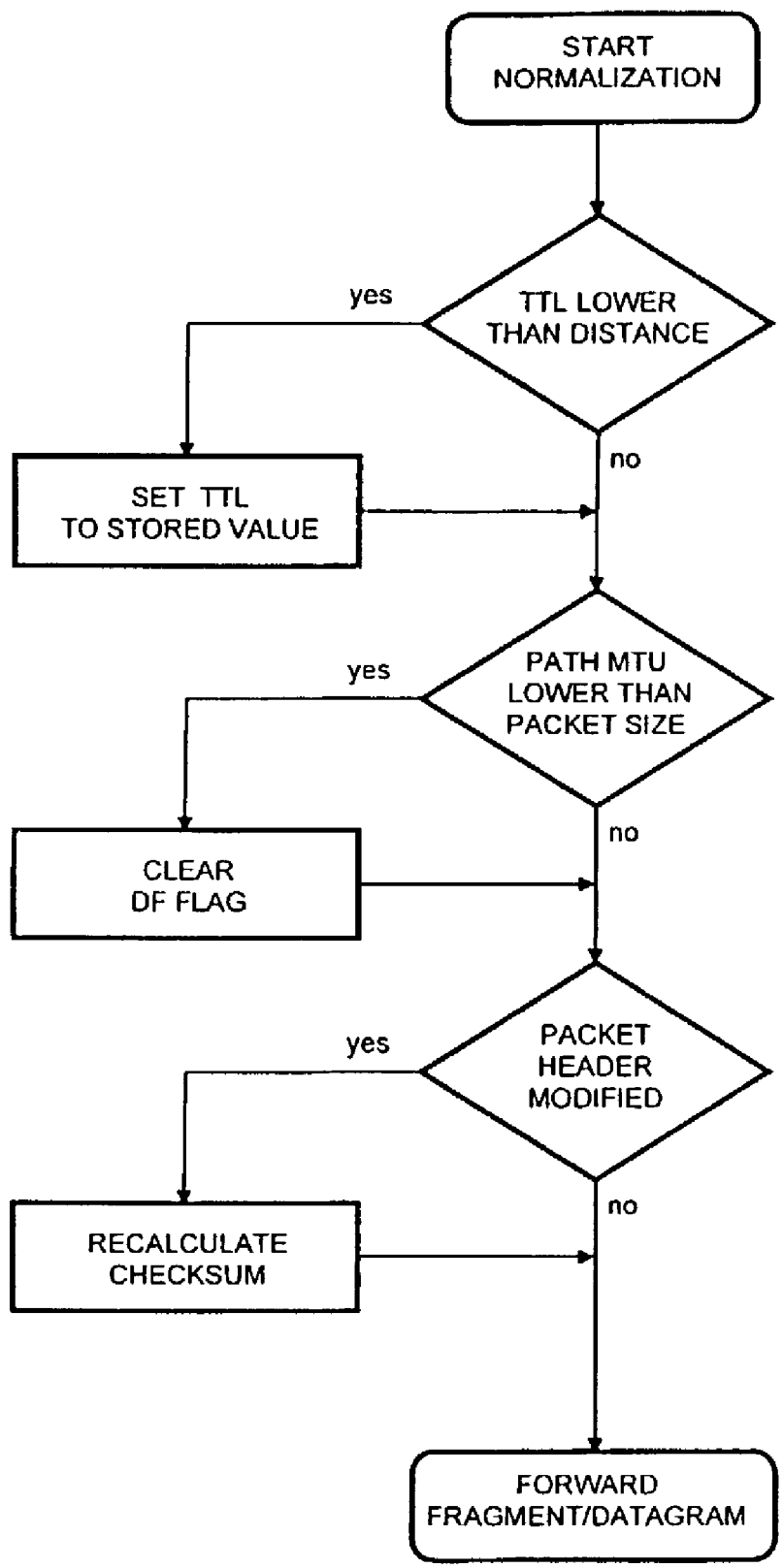
FIG. 11 shows the flow diagram of a core section of the normalization process as indicated in FIG. 10.

As shown in FIG. 10, in case that the destination address of an end-system, including corresponding topological data, is stored in the normalization table then ambiguities can be eliminated, else the traffic normalizer tries to obtain the required data or discards the received datagram or fragment, if the addressed end-system does not respond.

For a data packet, such as a datagram or fragment received, the TIME TO LIVE value and/or the path MTU measured for the addressed end-system are retrieved from the normalization table, and a)in case that the content in the TIME TO LIVE field is lower than the required value, then it is replaced by the retrieved value and/orb)in case that the path MTU is lower than the size of the data packet the do not fragment FLAG, in case that it is set, is cleared.

In case that the data packet required modification, then the checksum is recalculated before the data packet is forwarded to the addressed end-system.

Measurement of topological data such as the distance and/or the path MTU to an addressed end-system is preferably performed as shown in FIG. 12. The network normalizer sends a UDP packet with the do not fragment flag DF set and a size corresponding to the maximum transfer unit MTU of the first link towards the addressed end-system and then waits for the return of an ICMP-message. In case that an ICMP-message FRAGMENTATION REQUIRED BUT DF BIT SET is returned, then a further UDP packet with reduced size is sent to the addressed end-system.

In case that an ICMP-message PORT NOT REACHABLE is returned, because an unattended port had been selected, the distance, i.e. a value for the TIME TO LIVE field required to reach the end-system, is calculated and stored in the normalization table together with the probed path MTU.

Topological data, which is processed according to the inventive method, may of course also be measured with further techniques known to a man skilled in the art.

Entries in the normalization table are cleared or updated after predefined time periods T2 and T3 in order to ensure correct normalization and efficient management of system resources.

Figure 13:
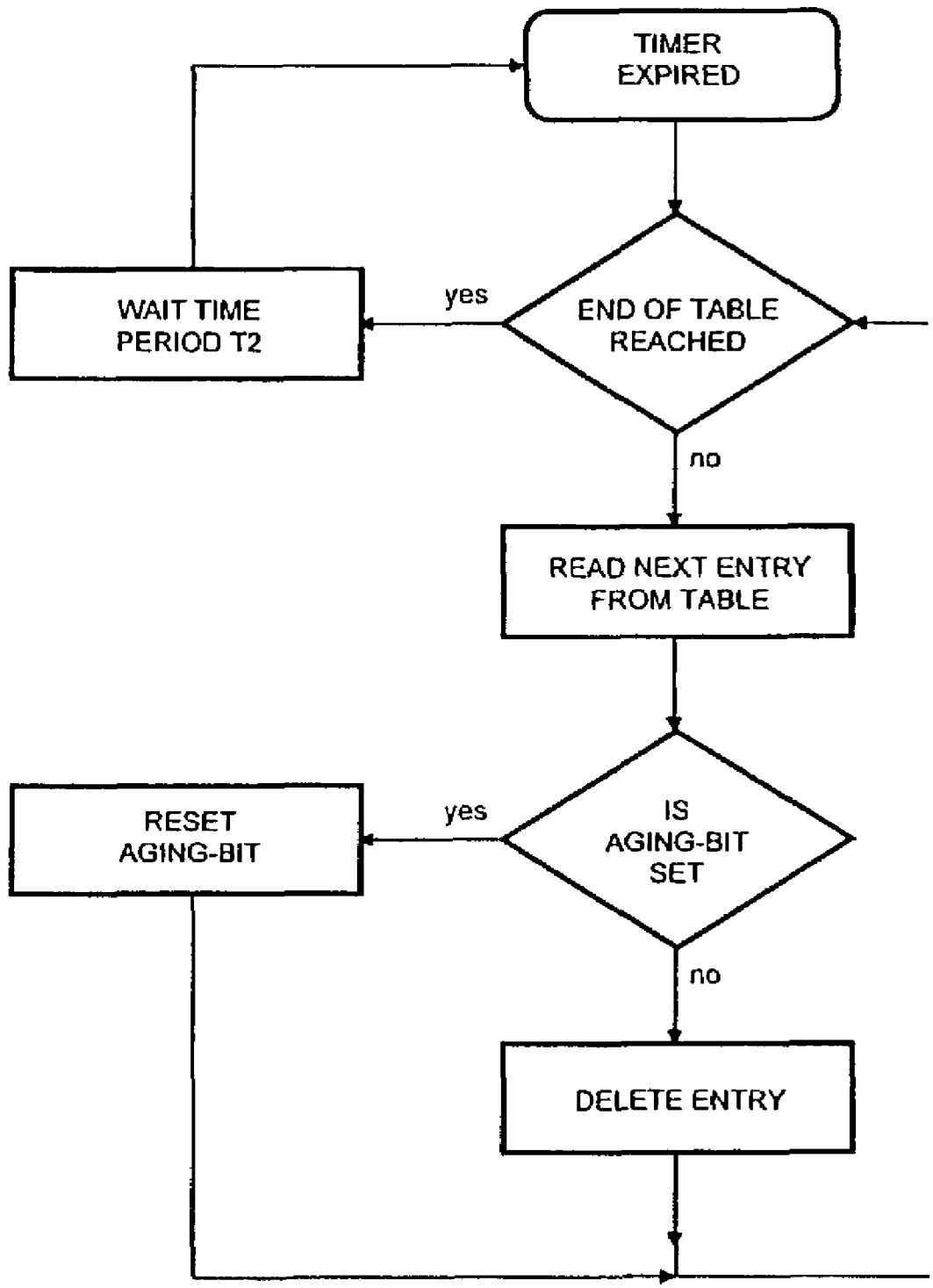
FIG. 13 shows the flow diagram of a process used for deleting obsolete entries in the normalization table.

FIG. 13 shows the flow diagram of a process used for deleting obsolete entries in the normalization table. For this purpose an aging bit is added to all entries in the normalization table which is set whenever said entry is retrieved from the normalization table. Periodically in intervals T2 the aging bits of all entries are sequentially reset and entries with aging bits that are already reset are deleted.

Figure 14:
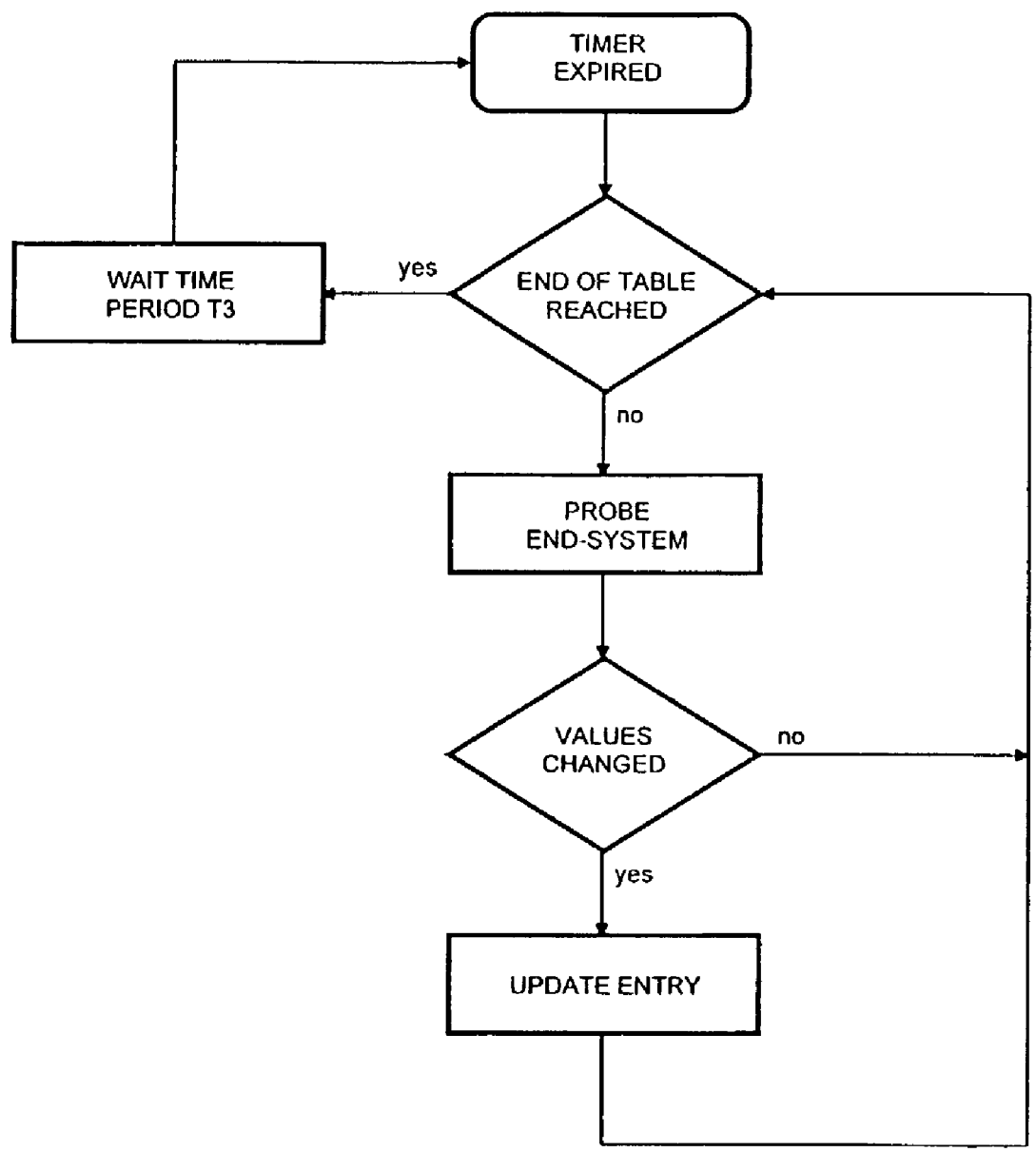
FIG. 14 shows the flow diagram of a process used for updating entries in the normalization table.

FIG. 14 shows the flow diagram of a process used for updating entries in the normalization table which may be necessary because of changes in the network topology.

Periodically after a time period T3, the distance and/or the path MTU to the end-systems corresponding to the entries stored in the normalization table are therefore sequentially probed and, in case that values have changed, the normalisation table is updated accordingly.

An inventive apparatus for normalization of traffic data as shown in FIG. 6 preferably comprises a control point connected to the traffic normalizer which comprises a storage unit containing the normalization table.

Control programs for probing and periodically updating characteristic values of the network topology are preferably stored in the control point. Programs for monitoring receipt of fragments, normalizing data, such as adjusting the content of the TIME TO LIVE field or resetting the do not fragment flag DF whenever required, and/or eliminating over aged entries in the normalization table are preferably stored in the network processor.

What has been described above is merely illustrative of the application of the principles of the present invention. Other arrangements can be implemented by those skilled in the art without departing from the spirit and scope of protection of the present invention.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

The invention claimed is:

1. A method for normalization of traffic data, received from an internet and transmitted to a local network, said method comprising:
   dynamically establishing and maintaining a normalization table in a traffic normalizer, said traffic normalizer being interposed between said internet and said local network;
   receiving a packet fragment from said internet at said traffic normalizer, said packet fragment being addressed to an end-system in said local network;
   determining if an entry exists in said normalization table for said packet fragment, said entry including an identifier comprising identifying information from IDENTIFICATION, PROTOCOL, SOURCE IP ADDRESS, and DESTINATION IP ADDRESS header fields of said packet fragment;
   if said entry exists in said normalization table, determining if a conflict exists between said entry and a prior entry;
   if said conflict exists, discarding said packet fragment; and
   if said conflict does not exist, simultaneously transferring said packet fragment to a network intrusion detection system and said end-system of said local network.

2. The method according to claim 1, all the limitations of which are incorporated herein by reference, wherein said entry further includes information from IDENTIFICATION, FLAGS, and FRAGMENT OFFSET header fields of said packet fragment, said information allowing calculation of a length of said packet fragment.

3. The method according to claim 2, all the limitations of which are incorporated herein by reference, wherein partial and complete receipt of a packet, comprising two or more packet fragments, is signaled by a sliding bit-mask that is moved to an offset, until said offset indicates receipt of all data of said packet.

4. The method according to claim 3, all the limitations of which are incorporated herein by reference, wherein said entry further includes information corresponding to at least one of a pre-calculated TIME TO LIVE and a path Maximum Transfer Unit (MTU) to said end-system in said local network.

5. The method according to claim 4, all the limitations of which are incorporated herein by reference, wherein:

when said pre-calculated TIME TO LIVE is less than a predetermined value, then said pre-calculated TIME TO LIVE replaces said predetermined value; and when said path MTU is less than a length of said packet, a do not fragment FLAG is cleared.

6. The method according to claim 1, all the limitations of which are incorporated herein by reference, wherein:

said dynamically establishing and maintaining comprises adding an aging bit to said entry; and said aging bit is set whenever said entry is retrieved from said normalization table.

7. The method according to claim 6, all the limitations of which are incorporated herein by reference, wherein said dynamically establishing and maintaining further comprises resetting said aging bit after a first period and deleting said entry with a previously set or reset aging bit.

8. The method according to claim 7, all the limitations of which are incorporated herein by reference, wherein said dynamically establishing and maintaining further comprises determining, after a second time period, at least one of a pre-calculated TIME TO LIVE and a path MTU to said end system and updating said entry.

9. A method for normalization of traffic data, received from an internet and transmitted to a local network, said method comprising:

dynamically establishing and maintaining a normalization table in a traffic normalizer, said traffic normalizer being interposed between said internet and said local network;

receiving a packet fragment from said internet at said traffic normalizer, said packet fragment being addressed to an end-system in said local network;

determining if an entry exists in said normalization table for said packet fragment, said entry including an identifier comprising identifying information from IDENTIFICATION, PROTOCOL, SOURCE IP ADDRESS, and DESTINATION IP ADDRESS header fields of said packet fragment;

if said entry exists in said normalization table, determining if a conflict exists between said entry and a prior entry;

if said conflict exists, discarding said packet fragment;

if said conflict does not exist, determining if a length of said packet fragment based on information from IDENTIFICATION, FLAGS, and FRAGMENT OFFSET header fields of said packet fragment, fits a sliding bit-mask;

if said packet fragment does not fit said sliding bit-mask, redirecting said packet fragment; and if said packet fragment does fit said sliding bit-mask, simultaneously transferring said packet fragment to a network intrusion detection system and said end-system of said local network.

10. The method according to claim 9, all the limitations of which are incorporated herein by reference, wherein partial and complete receipt of a packet, comprising two or more packet fragments, is signaled by a sliding bit-mask that is moved to an offset, until said offset indicates receipt of all data of said packet.

11. The method according to claim 10, all the limitations of which are incorporated herein by reference, wherein said entry further includes information corresponding to at least one of a pre-calculated TIME TO LIVE and a path Maximum Transfer Unit (MTU) to said end-system in said local network.

12. The method according to claim 11, all the limitations of which are incorporated herein by reference, wherein:

when said pre-calculated TIME TO LIVE is less than a predetermined value, then said pre-calculated TIME TO LIVE replaces said predetermined value; and when said path MTU is less than a length of said packet, a do not fragment FLAG is cleared.

13. A program storage device readable by machine, tangibly embodying a program of instructions executable by said machine to perform a method for normalization of traffic data, received from an internet and transmitted to a local network, said method comprising:

dynamically establishing and maintaining a normalization table in a traffic normalizer, said traffic normalizer being interposed between said internet and said local network;

receiving a packet fragment from said internet at said traffic normalizer, said packet fragment being addressed to an end-system in said local network;

determining if an entry exists in said normalization table for said packet fragment, said entry including an identifier comprising identifying information from IDENTIFICATION, PROTOCOL, SOURCE IP ADDRESS, and DESTINATION IP ADDRESS header fields of said packet fragment;

if said entry exists in said normalization table, determining if a conflict exists between said entry and a prior entry;

if said conflict exists, discarding said packet fragment; and if said conflict does not exist, simultaneously transferring said packet fragment to a network intrusion detection system and said end-system of said local network.

14. The program storage device according to claim 13, all the limitations of which are incorporated herein by reference, wherein:

said dynamically establishing and maintaining comprises adding an aging bit to said entry; and said aging bit is set whenever said entry is retrieved from said normalization table.

* * * * *